(12) United States Patent
Simmons et al.

(10) Patent No.: US 10,768,745 B2
(45) Date of Patent: *Sep. 8, 2020

(54) TOUCH SENSOR HAND-CONFIGURATION ANALYSIS

(71) Applicant: ATMEL CORPORATION, Chandler, AZ (US)

(72) Inventors: Martin J. Simmons, Whiteley (GB); Thomas Myers, Southhampton (GB)

(73) Assignee: Atmel Corporation, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,286

(22) Filed: Aug. 1, 2019

(65) Prior Publication Data

US 2019/0354229 A1 Nov. 21, 2019

Related U.S. Application Data

(63) Continuation of application No. 14/248,100, filed on Apr. 8, 2014, now Pat. No. 10,416,801.

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01)

(58) Field of Classification Search
CPC .... G06F 3/0416; G06F 3/044; G06F 3/04886; G06F 2203/04104; G06F 2203/04108
See application file for complete search history.

(56) References Cited

U.S. PATENT DOCUMENTS

| 7,663,607 | B2 | 2/2010 | Hotelling et al. |
| 7,864,503 | B2 | 1/2011 | Chang |
| 7,875,814 | B2 | 1/2011 | Chen et al. |
| 7,920,129 | B2 | 4/2011 | Hotelling et al. |
| 8,031,094 | B2 | 10/2011 | Hotelling et al. |

(Continued)

FOREIGN PATENT DOCUMENTS

WO 2012129247 A2 9/2012

OTHER PUBLICATIONS

Myers, S. A. et al., "Electronic Devices With Concave Displays," U.S. Appl. No. 61/454,936, filed Mar. 21, 2011, 23 pages.

(Continued)

*Primary Examiner* — Temesghen Ghebretinsae
*Assistant Examiner* — Karin Kiyabu
(74) *Attorney, Agent, or Firm* — TraskBritt (57) ABSTRACT

In certain embodiments, an apparatus includes controller circuitry and a touch sensor that includes first electrodes. The controller circuitry is configured to measure first capacitance values during a first time period, each first capacitance value associated with a respective first electrode. The controller circuitry is also configured to determine a first hand-usage value based at least on a distribution of the first capacitance values. The controller circuitry is also configured to estimate a hand-usage state based at least on the first hand-usage value. The hand-usage state indicates one of the following hand configurations: right-handed interaction with the touch sensor, left-handed interaction with the touch sensor, or two-handed interaction with the touch sensor.

17 Claims, 5 Drawing Sheets

(56) References Cited

U.S. PATENT DOCUMENTS

| | | |
|---|---|---|
| 8,031,174 B2 | 10/2011 | Hamblin et al. |
| 8,040,326 B2 | 10/2011 | Hotelling et al. |
| 8,049,732 B2 | 11/2011 | Hotelling et al. |
| 8,179,381 B2 | 5/2012 | Frey et al. |
| 8,217,902 B2 | 7/2012 | Chang et al. |
| 8,674,958 B1 | 3/2014 | Kravets et al. |
| 8,723,824 B2 | 5/2014 | Myers et al. |
| 8,760,426 B1 | 6/2014 | Strand et al. |
| 9,389,718 B1 * | 7/2016 | Letourneur ........... G06F 3/0412 |
| 9,477,330 B2 | 10/2016 | Stern |
| 2008/0309635 A1 | 12/2008 | Matsuo |
| 2009/0315854 A1 | 12/2009 | Matsuo |
| 2012/0098783 A1 | 4/2012 | Badaye et al. |
| 2012/0242588 A1 | 9/2012 | Myers et al. |
| 2012/0242592 A1 | 9/2012 | Rothkopf et al. |
| 2012/0243151 A1 | 9/2012 | Lynch |
| 2012/0243719 A1 | 9/2012 | Franklin et al. |
| 2012/0256872 A1 | 10/2012 | Kawaguchi et al. |
| 2013/0076612 A1 | 3/2013 | Myers |
| 2014/0267085 A1 * | 9/2014 | Li ........................... G06F 3/041 |
| | | 345/173 |
| 2015/0123923 A1 | 5/2015 | Stern |
| 2015/0301647 A1 | 10/2015 | Sato et al. |
| 2016/0070413 A1 | 3/2016 | Geaghan |
| 2016/0195986 A1 | 7/2016 | Kwon et al. |
| 2016/0299606 A1 | 10/2016 | Go |
| 2017/0131798 A1 | 5/2017 | Geaghan et al. |
| 2017/0153763 A1 | 6/2017 | Vavra et al. |

OTHER PUBLICATIONS

Lynch, S. B., "Electronic Devices With Convex Displays," U.S. Appl. No. 61/454,950, filed Mar. 21, 2011, 28 pages.

Rothkopf, F. R. et al., "Electronic Devices With Flexible Displays," U.S. Appl. No. 61/454,894, filed Mar. 21, 2011, 41 pages.

* cited by examiner

TOUCH SENSOR HAND-CONFIGURATION ANALYSIS

RELATED APPLICATION

This application is a continuation under 35 U.S.C. § 120 of U.S. application Ser. No. 14/248,100, filed Apr. 8, 2014 and entitled "Touch Sensor Hand-Configuration Analysis," incorporated herein by reference.

TECHNICAL FIELD

This disclosure relates generally to touch sensor technology, and more particularly to touch sensor hand-configuration analysis.

BACKGROUND

A touch sensor may detect the presence and location of a touch or the proximity of an object (such as a user's finger or a stylus) within a touch-sensitive area of the touch sensor overlaid on a display screen. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A controller may process the change in capacitance to determine the position of the object relative to the touch screen.

DESCRIPTION OF EXAMPLE EMBODIMENTS

Touch sensors can be operated using a variety of hand configurations. For example, the touch sensor can be operated by the user's right hand, the user's left hand, or both of the user's hands. Furthermore, the touch sensor may be operated by one or more of the user's thumbs, index fingers, or other fingers, or the touch sensor may be operated by another external object such as, for example, a stylus. Such hand configurations can affect various aspects of the user's touch sensor interactions.

Some embodiments of the present disclosure determine which of a user's hands is being used to operate the touch sensor of a device based on the distribution of capacitive measurements across the touch sensor. To determine the user's likely hand configuration, capacitive measurements may be taken from a plurality of the touch sensor's electrodes. Based on the distribution of these capacitive measurements throughout the touch sensor, a hand-usage value (such as, for example, a skewness value) may be calculated. A hand-usage state that identifies one or more of the above hand configurations can then be determined based at least on this hand-usage value. Some embodiments may also factor in alternative or additional measurements, such as capacitive measurements from a different set of electrodes or from a different time period, into the determination of the hand-usage state. Thus, the distribution of capacitive measurements may be used to improve the determination of the user's hand configuration. Furthermore, determination of the user's hand configuration using existing touch sensor components may improve the user experience without requiring additional sensors or other hardware, thereby reducing costs and hardware complexity.

Some embodiments communicate the hand-usage state or other information related to the hand-usage configuration to an operating system associated with the touch sensor. The hand-usage state can be used to modify one or more aspects of a graphical user interface (GUI) associated with the touch sensor. For example, a determination of left or right-handed usage may trigger changes in the layout of a GUI display, changes in touch-detection logic related to GUI elements, or various other functions. Adjusting GUI logic in this manner may provide an improved user experience by tailoring touch sensor interaction to the user's hand configuration, improving GUI visibility and usability. Furthermore, this process can be repeated over time to dynamically adjust device functionality as the user's hand configuration changes.

Figure 1:
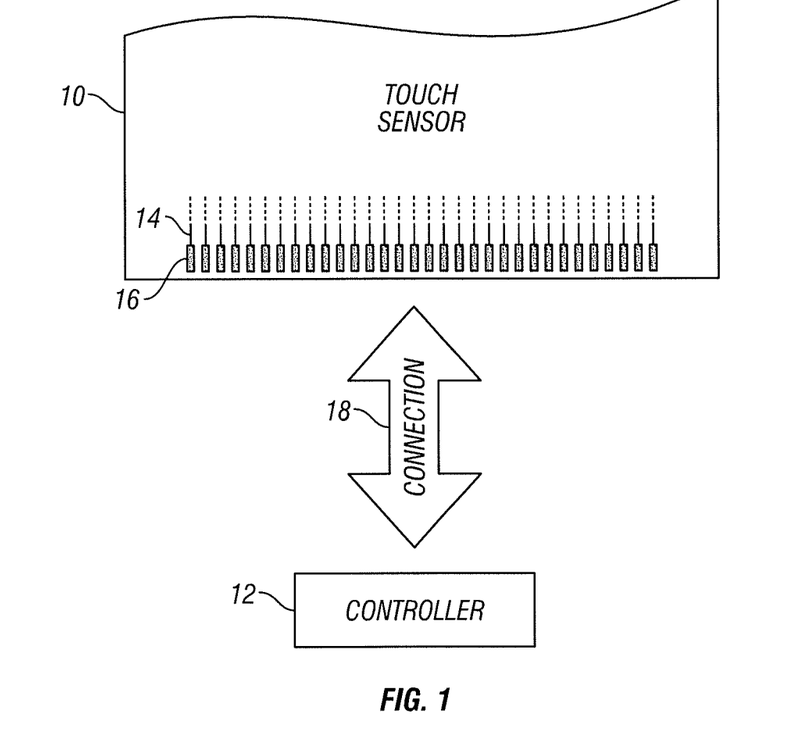
FIG. 1 illustrates an example of a touch sensor with an example of a controller, according to certain embodiments of the present disclosure.

FIG. 1 illustrates an example of a touch sensor with an example of a controller, according to certain embodiments of the present disclosure. Touch sensor 10 and controller 12 may detect the presence and location of a touch or the proximity of an object within a touch-sensitive area of touch sensor 10. Herein, reference to a touch sensor may encompass both the touch sensor and its controller, where appropriate. Similarly, reference to a controller may encompass both the controller and its touch sensor. Touch sensor 10 may include one or more touch-sensitive areas. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on. Alternatively, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM may encompass such material.

The shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates electrodes made of any suitable material.

As used herein, a capacitive node refers to a portion of touch sensor 10 that is configured to provide a distinct capacitive measurement. In various embodiments, capacitive nodes may have different sizes, shapes, and/or configurations. Furthermore, in some embodiments, the size, shape, and other aspects of a capacitive node may be determined by the configuration of controller 12 and may be changed dynamically during the operation of device 2. For example, in some embodiments, multiple electrodes or tracks 14 may be galvanically connected and sensed together, resulting in a capacitive node spanning multiple electrodes.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. A touch may refer to an external object touching a capacitive node directly or touching a cover or substrate adjacent to the capacitive node. By measuring changes in capacitance throughout the array, controller 12 may determine the position of the touch or proximity within the touch-sensitive area(s) of touch sensor 10. The change in capacitance measured by controller 12 may be referred to as a "delta capacitance." In certain embodiments, delta capacitance may be a difference or a ratio between the capacitance value measured or expected when the object and not present and the capacitance value measured during the sensing sequence. Delta capacitance may be measured relative to a baseline capacitance such as, for example, the capacitance measured when the external object is not present or the capacitance (or average capacitance) during one or more previous sensing sequences.

In a self-capacitance implementation, touch sensor 10 may include an array of electrodes of a single type that may each form a capacitive node. In such embodiments, a capacitive node may correspond to a single electrode, or a set of multiple connected electrodes, rather than an intersection of electrodes. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may be substantially perpendicular to sense lines, or drive lines and sense lines may cross at various angles. Herein, reference to a drive line may encompass one or more drive electrodes making up the drive line, and vice versa. Similarly, reference to a sense line may encompass one or more sense electrodes making up the sense line, and vice versa.

This disclosure contemplates electrodes disposed on any suitable number of substrates. For example, touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location at or near the position where the drive electrode and the sense electrode "cross" or come nearest each other in their respective planes. In such embodiments, the drive and sense electrodes do not make electrical contact with each other—instead they are capacitively coupled to each other across a dielectric at the intersection. The "intersection" may therefore refer to the apparent crossing of the electrodes from a perspective orthogonal to the surface of touch sensor 10. In some embodiments, this dielectric may be air, glass, plastic, or any suitable insulator.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs) or ASICs) of a device that includes touch sensor 10 and controller 12, which may respond to the touch or proximity input by initiating a function of the device (or an application running on the device). Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs), such as for example general-purpose microprocessors, micro controllers, programmable logic devices or arrays, application-specific ICs (ASICs). In particular embodiments, controller 12 comprises analog circuitry, digital logic, and digital non-volatile memory. In particular embodiments, controller 12 is disposed on a flexible printed circuit (FPC) bonded to the substrate of touch sensor 10, as described below. The FPC may be active or passive, where appropriate. In particular embodiments, multiple controllers 12 are disposed on the FPC. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components. Furthermore, various embodiments may have any suitable number of controllers 12, and the functions of controller 12 described herein may be performed by one or more controllers 12. Controller 12 is discussed further below with respect to FIG. 3.

Tracks 14 of conductive material disposed on the substrate of touch sensor 10 may couple drive or sense electrodes of touch sensor 10 to connection pads 16, also disposed on the substrate of touch sensor 10. As described below, connection pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14). Example electrodes are discussed below with respect to FIG. 2.

Connection pads 16 may be located along one or more edges of the substrate, outside the touch-sensitive area(s) of touch sensor 10. As described above, controller 12 may be on an FPC. Connection pads 16 may be made of the same material as tracks 14 and may be bonded to the FPC using an anisotropic conductive film (ACF). Connection 18 may include conductive lines on the FPC coupling controller 12 to connection pads 16, in turn coupling controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between controller 12 and touch sensor 10.

Certain embodiments of touch sensor 10 and controller 12 may measure capacitance or a change in capacitance using any suitable method. For example, voltage may be applied to one or more electrodes via one or more tracks 14 by opening or closing one or more switches. Such switches may connect one or more electrodes to other portions of touch sensor 10 or controller 12 such as, for example, a voltage source (e.g. a voltage supply rail), a current source, or any other suitable component. Such methods may cause charge to be transferred to or from one or more portions of one or more electrodes. In some embodiments, one or more electrodes may be sensed by controller 12 to measure a value associated with their capacitance. During mutual-capacitance sensing, charged electrodes may induce a transfer of charge on one or more separate electrodes, which may then be directly or indirectly sensed by controller 12. During self-capacitance sensing, controller 12 may directly or indirectly sense the same electrode that was previously charged. The presence of an object such as a finger or a stylus may change the amount of charge present on the sensed electrode, and this change may be measured by controller 12 to determine the position of the object.

The measured position of the object may be a distance between the object and touch sensor 10 (e.g., a hover detection) or a projection of a portion of the object onto touch sensor 10 (e.g., a point on touch sensor 10 where the object is touching or hovering). Thus, in an embodiment where the surface of touch sensor 10 lies in the X-Y plane and the Z axis is orthogonal to the X-Y plane, the position may correspond to the X coordinates of the object, Y coordinates, Z coordinates, X-Y coordinates, X-Z coordinates, Y-Z coordinates, X-Y-Z coordinates, any reference position correlating with X, Y, or Z coordinates, or any other suitable position information. In certain embodiments, the same measured values may be used to determine both of the distance between the object and touch sensor 10 and the projection of a portion of the object onto touch sensor 10. Controller 12 may also factor in additional measurements to determine this position. For example, multiple electrodes may be sensed synchronously or in close succession, and the position of the object may be determined based on a calculation factoring in each of these measurements. Furthermore, controller 12 may utilize additional calculations to facilitate determination of the position. For example, certain embodiments may use weighted averages, linear approximation, any other suitable calculation, or any suitable combination thereof to facilitate the determination of the object's position.

Certain embodiments may perform measurements using any suitable number of steps that facilitate capacitance measurements. For example, some embodiments may perform any suitable combination of pre-charging one or more electrodes, charging one or more electrodes, transferring charge between two or more electrodes, discharging one or more electrodes, and/or any other suitable step. Capacitive changes resulting from a user's interaction with touch sensor 10 can be measured in any suitable manner. As used herein, a "capacitance value" or a "capacitance measurement" may refer to any measured or calculated value that directly or directly indicates the capacitance of a capacitive node or a change in such capacitance. For example, certain embodiments may utilize voltage measurements, current measurements, timing measurements, any other suitable measurement, or any combination thereof to measure capacitance or a change in capacitance at one or more capacitive nodes. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of an object's position relative to touch sensor 10.

Figure 2:
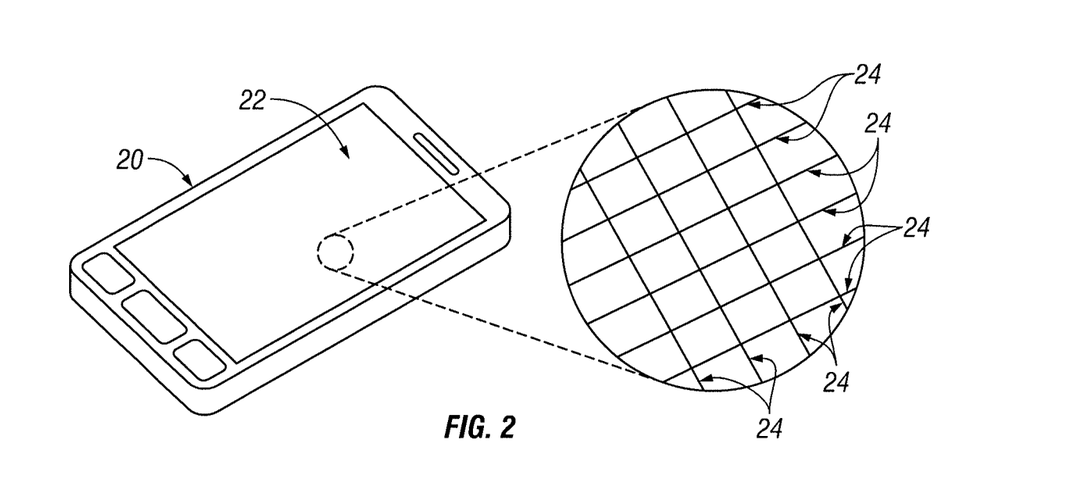
FIG. 2 illustrates an example of a device and examples of electrodes, according to certain embodiments of the present disclosure.

FIG. 2 illustrates an example of a device and examples of electrodes, according to certain embodiments of the present disclosure. In the illustrated embodiment, device 20 includes display 22 and electrodes 24.

Device 20 may be any device capable of touch sensing. In various embodiments, device 20 may be a smartphone, tablet computer, laptop computer, touch pad, touch screen, or any suitable device utilizing a touch sensor 10. Device 20 may include a display 22 that may be overlaid by or otherwise positioned proximate to touch sensor 10. Display 22 and touch sensor 10 may be substantially planar, curved, or have any other suitable configuration. Additional components used in certain embodiments of device 20 are shown in FIG. 3.

Electrodes 24 may be any conductive material disposed on touch sensor 10 that are sensed directly or indirectly by controller 12 to determine the presence or location of an external object. Electrodes 24 have any structure, configuration, or function of the electrodes described above with respect to FIG. 1. While the illustrated embodiment depicts certain electrodes 24 running across display 22 perpendicular to certain other electrodes 24, other embodiments may use any suitable configuration of electrodes 24. For example, certain embodiments of electrodes 24 may utilize different shapes, patterns, or configurations. Furthermore, certain embodiments may use different types, shapes, or configurations of electrodes 24 within the same touch sensor 10. For example, in some embodiments, electrodes 24 may be electrode "lines" that may be parallel, perpendicular or have any suitable orientation relative to other electrodes 24. Such "lines" may include non-linear micro-features. Each electrodes 24 may include multiple interconnected electrodes that are connected by other track segments. Such electrodes may have any suitable shape (e.g., square, round, triangular, hexagonal, or any other suitable shape), and some embodiments may include multiple types of electrodes. In some embodiments, one or more of the electrodes may be a mesh of conductive lines having any suitable pattern or configuration. Furthermore, in some embodiments, electrodes 24 may include multiple layers separated by an insulator. For example, electrodes 24 running in one direction may be included in a first layer, while electrodes 24 running in a different direction may be included in a second layer, with the first and second layers being separated by an insulator or other dielectric material. As used herein, an electrode 24 may refer to one or more electrodes, other segments interconnecting these electrodes, or tracks of conductive material connecting the electrodes to controller 12.

Figure 3:
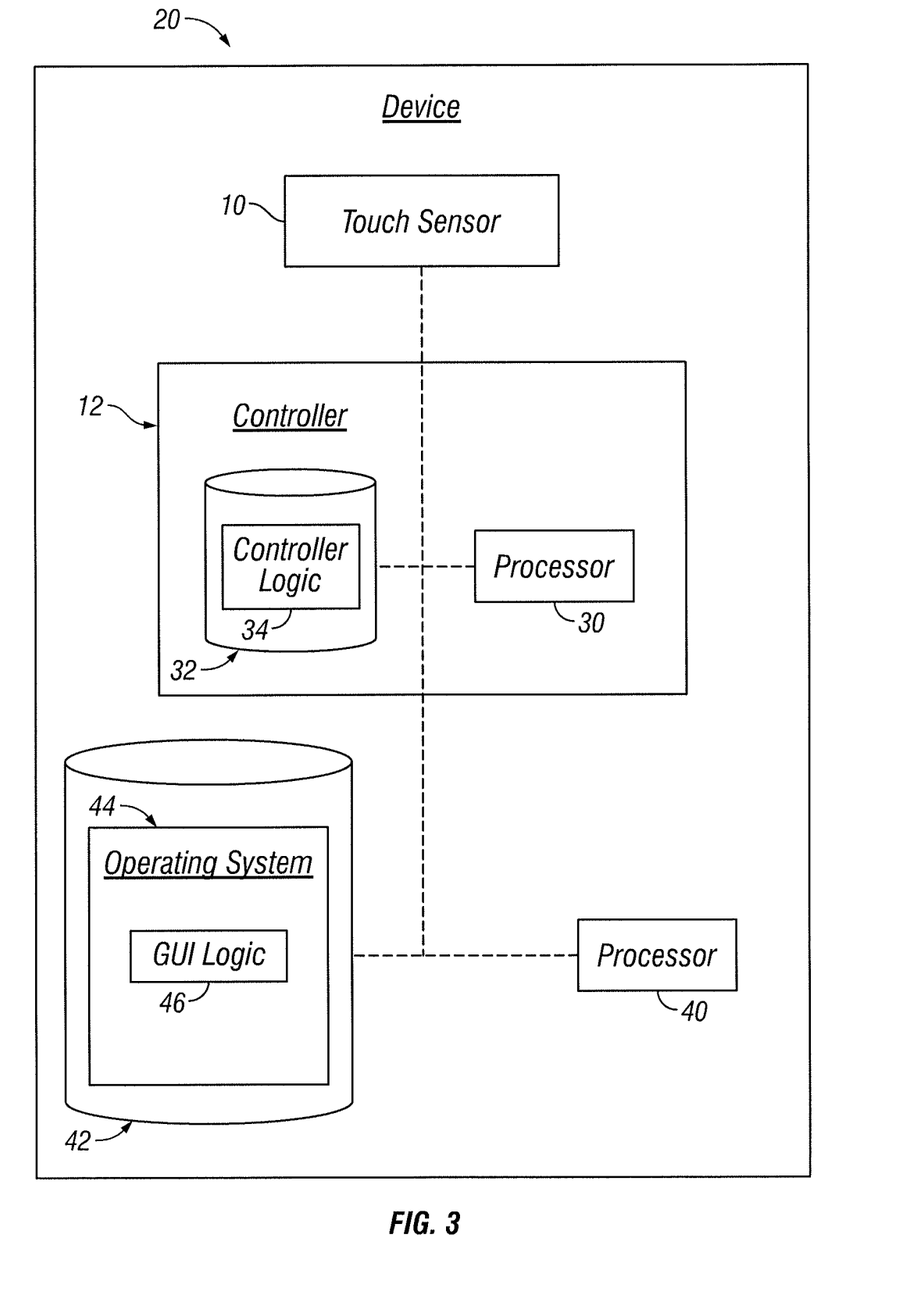
FIG. 3 illustrates components of an example of a device, according to certain embodiments of the present disclosure.

FIG. 3 illustrates components of an example of a device, according to certain embodiments of the present disclosure. As shown in FIG. 3, device 20 includes touch sensor 10, controller 12, processor 40, and memory 42. While, controller 12 is shown as being communicatively connected to touch sensor 10, processor 40, and memory 42, any suitable interconnection of components may be used.

Controller 12 may have any structure, configuration, or function described above with respect to FIG. 1. In the illustrated embodiment, controller 12 includes processor 30 and memory 32. Processor 30 may have any processing structure, configuration, or function described above with respect to controller 12. For example, processor 30 may be a programmable logic device, a microcontroller, a microprocessor, any suitable processing device, or any suitable combination thereof. Memory 32 may have any memory structure, configuration, or function described above with respect to controller 12. For example, memory 32 may include volatile or nonvolatile components operable to store data. Memory 32 may include random access memory (RAM), read only memory (ROM), flash memory, magnetic storage devices, optical storage devices, network storage devices, cloud storage devices, solid state devices, or any other suitable information storage components or a combination of these components. Memory 32 stores controller logic 34, which includes any suitable set of instructions, logic, or code embodied in a computer-readable storage medium and operable to perform touch-sensing measurements using touch sensor 10, perform hand-usage calculations, or perform any other suitable function.

Processor 40 may be a programmable logic device, a microcontroller, a microprocessor, any suitable processing device, or any suitable combination thereof. Processor 40 performs information processing to control the operation of device 20. For example, processor 40 may control a graphical display, control audio components, run applications, or perform other information processing for device 20. While processor 30 and processor 40 are illustrated as separate components, other embodiments may utilize a single processor that performs the functions of both components.

Memory 42 may be any set of components operable to store information for device 20. Memory 42 may include volatile or nonvolatile components. For example, memory 42 may include random access memory (RAM), read only memory (ROM), flash memory, magnetic storage devices, optical storage devices, network storage devices, cloud storage devices, solid state devices, or any other suitable information storage device or a combination of these devices. While memory 32 and memory 42 are illustrated as separate components, other embodiments may utilize a single memory that performs the functions of both components. In the illustrated embodiment, memory 42 stores operating system 44, and memory 42 may also store other programs or applications associated with device 20.

Operating system 44 includes any data or logic operable to support the functions of device 20. Operating system 44 may operate to manage hardware resources of device 20, provide common services for applications running on device 20, or perform any suitable function to manage the operation of device 20. As shown in FIG. 3, operating system 44 includes GUI logic 46, which includes any suitable set of instructions, logic, or code embodied in a computer-readable storage medium and operable to control one or more graphical displays. For example, GUI logic 46 controls the display of certain graphical components on display 22 and interprets user interactions with touch sensor 10. In some embodiments, operating system 44 receives information about the user's hand configuration (such as, for example, hand-usage values or hand-usage states), and this information is used to modify one or more parameters of GUI logic 46 to accommodate the user's hand configuration. For example, controller 12 may determine that a user is operating device 20 using a particular hand configuration, and this hand-usage state may be communicated directly to operating system 44. In other embodiments, controller 12 may communicate one or more hand-usage values to operating system 44, and operating system 44 may itself determine the user's hand configuration. Adjusting the graphical display of device 20 in this manner provides an improved user experience by dynamically adjusting the display to account for the position of the user's hand configuration or other aspects the user's touch inputs.

Figure 4:
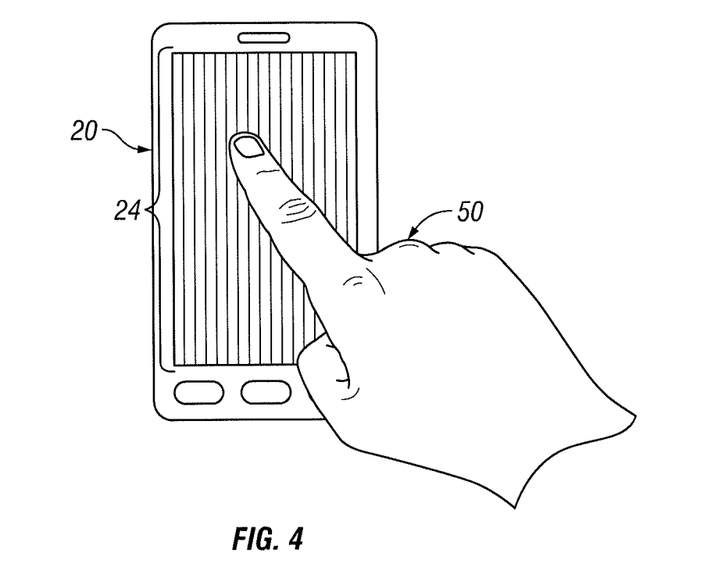
FIG. 4 illustrates an example of a device operated by a user's right hand, according to certain embodiments of the present disclosure.

FIG. 4 illustrates an example of a device operated by a user's right hand, according to certain embodiments of the present disclosure. In the illustrated embodiment, object 50 is interacting with device 20, which includes electrodes 24. While illustrated as a user's hand, object 50 may be any object that can be detected by touch sensor 10 (e.g., a finger, a stylus, or any external object capable of affecting the capacitance of electrodes 24). For purposes of simplified illustration, only electrodes 24 running in a single direction are shown.

Figure 5:
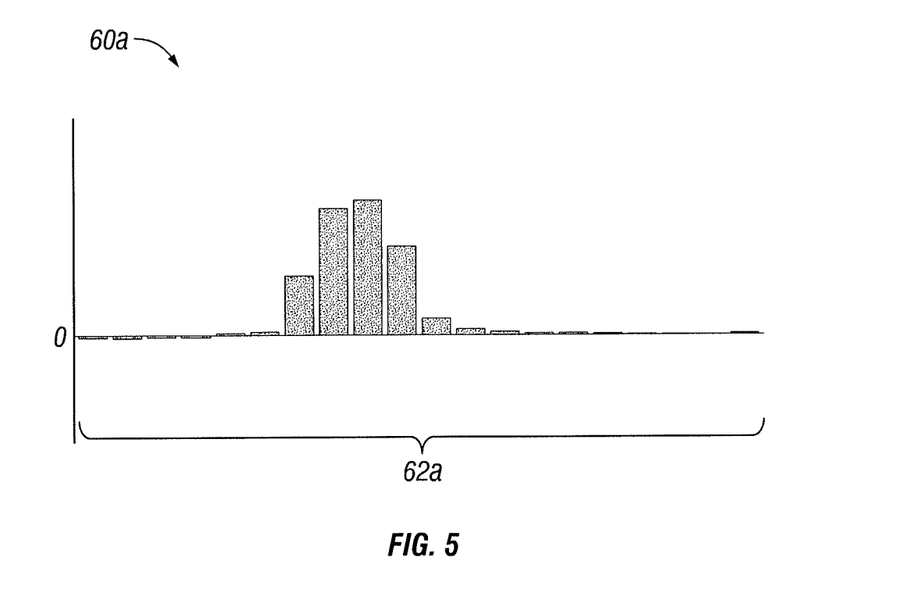
FIG. 5 illustrates examples of capacitive measurements, according to certain embodiments of the present disclosure.

FIG. 5 illustrates examples of capacitive measurements taken by controller 12 according to certain embodiments of the present disclosure. Graph 60a includes examples of capacitance values 62a that may be measured while device 20 is being operated using the hand configuration shown in FIG. 4. Each capacitance value 62a shown in graph 60a corresponds to a respective electrode 24 from FIG. 4. For example, the measurement from the leftmost electrode 24 in FIG. 4 is shown as the leftmost capacitance value 62a in FIG. 5. As shown in FIG. 5, the magnitudes of capacitance values 62a are affected by the proximity of object 50. Controller 12 analyzes the distribution of these values to estimate the user's hand configuration. For example, when a user is interacting with touch sensor 10 using a right hand (or an object held in the right hand), electrodes on the right side of the touch location tend to show greater delta capacitance values due to the proximity of the user's hand. As shown in FIG. 4, the user's right hand trails off to the right of the touch position, which will tend to cause greater delta capacitances in electrodes to the right of the touch position. The distribution of the measured capacitance values may then be analyzed to determine which hand configuration is being used. Some embodiments determine a hand-usage value based on the distribution of the measured capacitance values. The hand-usage value can be any value that is based on the distribution of the touch measurements and that can be used to estimate the user's hand configuration. In some embodiments, the hand-usage value is a skewness value. For example, controller 12 may calculate the skewness of capacitance values 62a, as discussed further below, or use any other suitable analysis of the distribution of the touch measurements.

Figure 6:
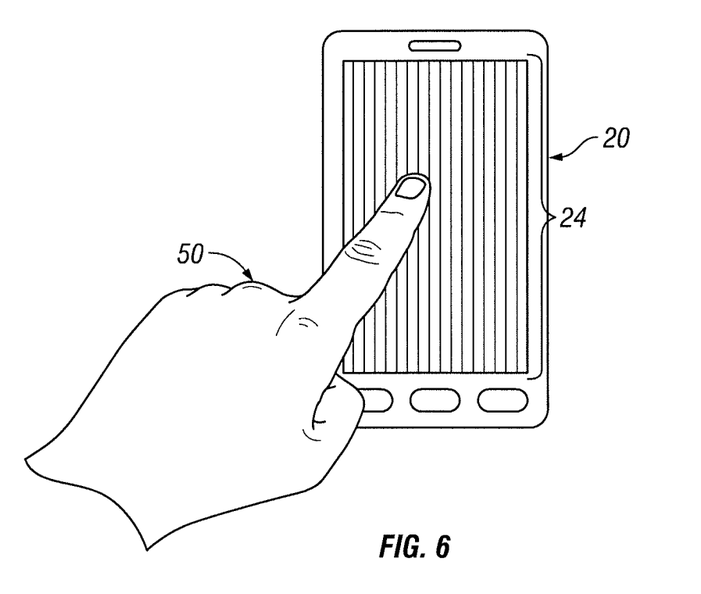
FIG. 6 illustrates an example of a device operated by a user's left hand, according to certain embodiments of the present disclosure.
Figure 7:
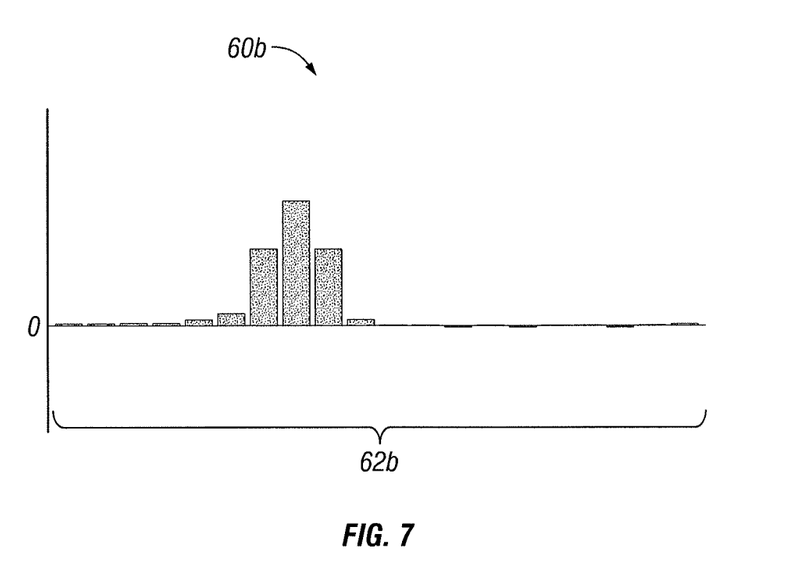
FIG. 7 illustrates examples of capacitive measurements, according to certain embodiments of the present disclosure.

FIGS. 6 and 7 illustrate an example left-handed usage of device 20 and corresponding capacitance measurements. The depictions of FIGS. 6 and 7 are analogous to those of FIGS. 4 and 5, respectively. Graph 60b includes capacitance values 62b, each of which corresponds to a respective electrode 24 of FIG. 6. As shown in FIG. 7, the magnitudes of capacitance values 62b are affected by the position of object 50. Controller 12 analyzes the distribution of these values to estimate the user's hand configuration. As shown in graph 60b, the left-handed usage of device 20 in FIG. 6 results in a different distribution of the capacitive measurements across touch sensor 10. As shown in FIG. 6, the user's left hand trails off to the left of the touch position, which will tend to cause greater delta capacitances in electrodes to the left of the touch position. The distribution of the measured capacitance values may then be analyzed as discussed above with respect to FIGS. 4-5 to determine which hand configuration is being used.

Any suitable calculations may be used to estimate the user's hand configuration based on the distribution of the capacitive measurements from the array of electrodes of touch sensor 10. Some embodiments calculate one or more skewness values to determine the user's hand configuration. For example, in a particular embodiment, the example capacitance values shown in FIGS. 5 and 7 have skewness values of approximately 1.12 and −1.33, respectively, using the following equation:

$$\text{skewness} = \frac{\sum_{y=start}^{end}\left(\frac{y - \text{touch\_position}}{\sigma}\right)^3}{end - start}$$

In the above equation, start and end are the positions of the first and last electrodes on the measured region of the touch sensor, respectively. Thus, y represents the position of a particular electrode on the touch sensor. The touch_position value represents the calculated position of the touch based on the capacitance values as shown in FIGS. 5 and 7 and explained above with respect to FIG. 1. Furthermore, σ represents the standard deviation, calculated using the equation shown below where symbols start, end, y, and touch_position have the same meaning discussed above:

$$\sigma = \sqrt{\frac{\sum_{y=start}^{end}(y - \text{touch\_position})^2}{end - start}}$$

A positive skewness value is calculated in FIG. 5 because of higher capacitance values to the right of the touch position, which is caused by the greater proximity of the user's hand on the right side of the touch position. Conversely, given the hand configuration shown in FIG. 7, a negative skewness value is calculated because of higher capacitance values to the left of the touch position, which is caused by the greater proximity of the user's hand on the left side of the touch position. Thus, a positive skew results from a longer "tail" to the right of the touch position, and a negative skew results from a longer "tail" to the left of the touch position. Controller 12 may therefore be able to estimate the user's hand configuration based on the skewness value or other hand-usage values determined based on the distribution of the capacitance values. Particular examples of how skewness values or other hand-usage values are used to estimate the user's hand configuration are discussed below with respect to FIG. 8.

As another example of how the distribution of capacitance values can be analyzed to determine the user's hand configuration, some embodiments may analyze the capacitance values from electrodes at the edge of touch sensor 10. In certain hand-held devices, larger delta capacitance values at one edge of touch sensor 10 (when the touch position is located elsewhere on touch sensor 10) may indicate that the device is being held in the user's left hand while the touch screen is being operated by the user's right hand (in which case the user's thumb or the base of the user's palm may hang over the left edge of touch sensor 10). Other embodiments may use similar calculations based on predetermined capacitance distribution patterns associated with typical device usage. The determination of the hand-usage state may factor in such calculations in addition to or in place of the types of calculations discussed above. Furthermore, some embodiments may adjust one type of calculation based on another calculation. For example, controller 12 may interpret a hand-usage value differently when it determines that the user is operating the device with a thumb rather than a finger.

Figure 8:
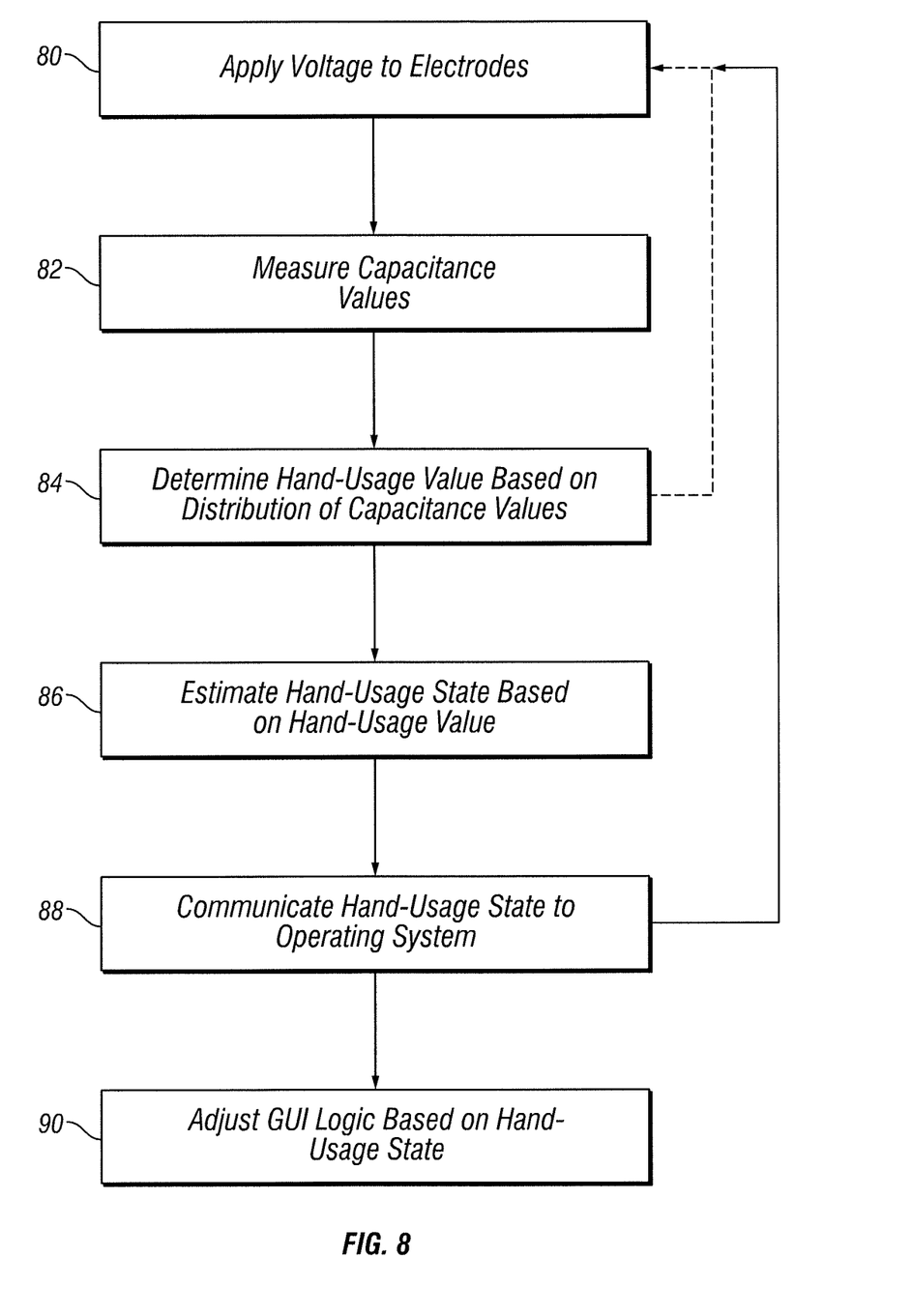
FIG. 8 illustrates an example of a method for determining which of a user's hands is interacting with a touch sensor, according to certain embodiments of the present disclosure.

FIG. 8 illustrates an example of a method for determining the user's hand configuration, according to certain embodiments of the present disclosure. Various embodiments may perform some, all, or none of the steps described below. Furthermore, certain embodiments may perform these steps in different orders, and certain embodiments may also perform additional steps. Moreover, any suitable component of touch sensor 10 or controller 12 may perform one or more steps of the sensing sequence. While particular embodiments are discussed in which skewness calculations are used to determine hand usage, other embodiments may use any suitable type of calculation in addition to or in place of skewness.

At step 80, controller 12 applies voltage to one or more electrodes. For example, one or more electrodes 24 may be charged in any suitable manner as described above with respect to FIGS. 1-3. At step 82, controller 12 measures capacitance values of the one or more electrodes 24. As explained above, capacitance values may include actual capacitance measurements or other values that serve as a proxy for or otherwise indicate capacitance. For example, controller 12 may measure voltage as proxy for the delta capacitance. In some embodiments, a single electrode may be charged at a time, followed by the measurement of a single capacitance value, with these steps being repeated for each electrode that is to be measured. Other embodiments may perform two or more of these calculations simultaneously.

Some embodiments may utilize self-capacitance measurements. In such embodiments, the electrode measured during step 82 may be the same electrode charged during step 80, and multiple measurements may be taken successively or simultaneously to provide capacitance values for multiple electrodes. Other embodiments may utilize mutual-capacitance measurements. In these embodiments, a drive line may be charged during step 80, while sense lines are measured during step 82. In particular mutual-capacitance embodiments, a capacitance value for a particular drive electrode may be calculated by summing, averaging, or otherwise combining the capacitive measurements from a plurality of the sense electrodes. For example, in an embodiment with two layers of electrodes 24, the electrodes of one layer ("X" electrodes, for example) may be substantially perpendicular to the electrodes of the other layer ("Y" electrodes, for example). A Y electrode may be driven while each X electrode is measured separately. These separate measurements may then be summed, averaged, or otherwise combined to provide a single capacitive value for the driven Y electrode. This process may then be repeated for each Y electrode to provide a plurality of capacitance values. In alternative mutual-capacitance embodiments, a Y electrode may be driven while multiple X electrodes are sensed simultaneously to provide a single capacitance value for that Y electrode.

At step 84, controller 12 calculates a hand-usage value based at least on the distribution of the capacitance values. In certain embodiments, the hand-usage value may be any value that is calculated based on the distribution of the capacitance values and that is used to estimate the user's hand configuration. In some embodiments, the hand-usage value is a skewness value as described above with respect to FIGS. 4-7. Other embodiments may use any suitable value that is indicative of the user's hand-configuration. For example, certain embodiments may use calculations that depend on the relative magnitudes of the capacitance values from electrodes on different sides of a touch position. Some embodiments may calculate the hand-usage value based on capacitance values associated with each electrode of touch sensor 10, while other embodiments may calculate the hand-usage value based on capacitance values associated with a subset of these electrodes.

Controller 12 may proceed to step 86 after calculating the hand-usage value, or it may repeat steps 80, 82, and 84 to calculate one or more additional hand-usage values before proceeding to step 86. For example, controller 12 can determine the hand-usage state and report it to the operating system at regular intervals (such as, example, once every half-second, once every second, once every two seconds, or any other suitable interval). Such embodiments may avoid unnecessary calculations and reporting when individual hand-usage values are calculated over a time interval that is significantly shorter than the amount of time required for a user to change hand configurations. Controller 12 may also maintain a running tally, average, or other composite value that tracks hand-usage values over time.

At step 86, controller 12 estimates a hand-usage state based at least on the hand-usage value. In some embodiments, the hand-usage state may be any parameter indicating a likelihood that the user is interacting with touch sensor 10 using a particular hand configuration. For example, the hand-usage state may indicate right-handed interaction, left-handed interaction, or two-handed interaction with the touch sensor. Hand-usage state may indicate additional aspects of a touch or hover interaction, though this is not required. For example, hand-usage state may indicate the type of object interacting with touch sensor 10 (such as a finger, thumb, stylus, or other object), or it may indicate whether a user is interacting with touch-sensor 10 using a bare hand or a gloved hand. In other embodiments, these additional aspects of touch or hover interaction may be determined or communicated separately from handedness information. Certain embodiments may use hand-usage states that indicate any suitable combination of these hand configurations. For example, a particular hand-usage state may indicate that the user is holding the device in both hands while using both thumbs to interact with touch sensor.

In some embodiments, controller 12 estimates a hand-usage state based on multiple hand-usage values. For example, hand-usage values corresponding to different time periods may be factored into a single hand-usage state. In some embodiments, due to variability in capacitive measurements, a single hand-usage value calculated from a single set of capacitance values measured during a brief time period may be less probative of the user's hand configuration than multiple hand-usage values calculated from capacitance values measured during successive time windows. Some embodiments may therefore base the estimation of the hand-usage state on multiple hand-usage values calculated during different time periods. For example, controller 12 may average or otherwise combine hand-usage values measured successively during a longer time window (for example, a half-second, one second, two seconds, or any suitable time window). Other embodiments may maintain a continuously updated estimate of the hand-usage state based on multiple previous hand-usage values. Hand-usage values may also be weighted based on a variety of factors. For example, more recent hand-usage values may be weighted more heavily. Other factors may also indicate that particular hand-usage values are more reliable than others, and such values can be weighted accordingly. Furthermore, some embodiments may factor in hand-usage values calculated from different sets of electrodes. For example, one hand-usage value may be calculated based on the distribution of the capacitance values of electrodes running in one direction (for example, the "Y" electrodes discussed above with respect to FIGS. 4-7), and another hand-usage value may be calculated based on the distribution of the capacitance values of different electrodes running in another direction (for example, the "X" electrodes discussed above with respect to FIGS. 4-7).

In step 88, controller 12 communicates the hand-usage state to operating system 44. As discussed above, reporting of the hand-usage state may be triggered by various factors. For example, hand-usage state may be reported at regular time intervals or upon determination that the hand-usage value exceeds or falls below a threshold value. For example, controller 12 may report the hand-usage state multiple times per second, once per second, less than once per second, or at any suitable interval. Controller 12 may also report hand-usage state upon detecting a change from a previous hand-usage state. Certain embodiments may use some, all, or none of these triggers. Furthermore, controller 12 may communicate any suitable type of data indicating the user's hand configuration. For example, controller 12 may report hand-usage values themselves (allowing operating system 44 to make its own determination of the hand-usage state), a percentage likelihood that a particular hand configuration is in use, an affirmative determination of a particular hand-usage state, or any suitable information indicating the user's hand configuration.

In step 90, GUI logic 46 is adjusted based on the hand-usage state. In some embodiments, operating system 44 adjusts one or more parameters associated with the display, while in other embodiments, operating system 44 may communicate the hand-usage state to an application, service, driver, or other module to facilitate adjustment of the GUT logic. Other embodiments may use any suitable technique for adjusting display parameters. GUI logic 46 may be adjusted in a variety of ways. For example, the layout of a GUI may be changed based on the user's hand configuration. As a particular example, one or more buttons, menu items, or other graphical components may be moved or otherwise altered based on the hand-usage state. As another example, GUI logic that interprets whether a particular touch interacts with a particular GUI component (for example, a button, text window, or other touch sensitive component) may be altered based on the hand-usage state. For example, right and left-handed users attempting to touch a particular point on touch sensor 10 may generate touch measurements that are slightly off from the intended target due to the shape or orientation of the touching finger. Similar tendencies are associated with thumb vs. finger interaction, hand vs. stylus interaction, and other distinct hand configurations. Zones of sensitivity or other hit-detection parameters may therefore be adjusted to accommodate these tendencies. Such adjustments can be utilized in any suitable touch-sensitive application where GUI logic determines which GUI component was touched by the user. Such applications include auto-correction while typing, menu activation, or other touch-sensitive applications. Operating system 44 or other applications can also adjust any other suitable parameters based on the hand-usage state, including audio parameters, motion-sensitivity parameters, or any other type of parameter.

The above steps may be repeated any number of times to provide dynamic adjustments based on the user's hand configuration. These steps need not be performed in the exact order described above. Furthermore, while certain steps are described as being performed by a particular component, any suitable component of device 20 may perform the functions discussed above.

The flowchart and block diagrams in the above figures illustrate the architecture, functionality, and operation of example implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figure. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, while particular skewness calculations are discussed above, other embodiments may utilize any suitable calculations to estimate the user's hand configuration based on the distribution of capacitance values. As another example, different embodiments may estimate different types of hand-usage states, may base their estimates on different types of hand-usage values, and may report hand-usage states based on different triggers. As yet another example, different embodiments can perform different types of GUI logic adjustments in response to the hand-usage state. Furthermore, certain embodiments may alternate between or combine one or more touch-sensing methods described herein. For example, some embodiments may alternate between mutual-capacitance sensing and self-capacitance sensing as described above.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device, comprising:
a touch sensor;
a display; and
controller circuitry configured to:
   measure a plurality of capacitance values, each capacitance value associated with a respective electrode of an array of electrodes of the touch sensor;
   determine, based on the plurality of capacitance values, a touch position;
   determine a skewness value using a start position of a start electrode at a first end of the array of electrodes, an end position of an end electrode at a second end of the array of electrodes, and the touch position;
   estimate a hand-usage state based at least on the skewness value; and
   determine the skewness value using the following formula:

$$\text{skewness\_value} = \frac{\sum_{y=start}^{end} \left(\frac{y - \text{touch\_position}}{\sigma}\right)^3}{end - start},$$

where
   start represents the start position of the start electrode at the first end of the array of electrodes;
   end represents the end position of the end electrode at the second end of the array of electrodes;
   y represents a position of a particular electrode of the array of electrodes;
   touch position represents the touch position; and
   σ represents a standard deviation.

2. The device of claim 1, wherein the hand-usage state indicates whether a user of the device is interacting with the touch sensor using a finger, a thumb, or a stylus.

3. The device of claim 1, wherein the hand-usage state indicates whether a user of the device is interacting with the touch sensor using a bare hand or a gloved hand.

4. The device of claim 1, wherein the controller circuitry is further configured to:
determine, based on the hand-usage state, that a user is interacting with the touch sensor with a left hand; and
activate one or more touch sensitive components of the device based on the determination that the user is interacting with the touch sensor with the left hand.

5. The device of claim 1, wherein the controller circuitry is further configured to:
determine, based on the hand-usage state, that a user is interacting with the touch sensor with a right hand; and
deactivate one or more touch sensitive components of the device based on the determination that the user is interacting with the touch sensor with the right hand.

6. The device of claim 1, wherein the controller circuitry is further configured to communicate the hand-usage state to an operating system associated with the device, the operating system configured to adjust, based at least on the hand-usage state, one or more parameters associated with a graphical user interface.

7. A method, comprising:
measuring a plurality of capacitance values, each capacitance value associated with a respective electrode of an array of electrodes of a touch sensor;
determining, based on the plurality of capacitance values, a touch position; determining a skewness value using a start position of a start electrode at a first end of the array of electrodes, an end position of an end electrode at a second end of the array of electrodes, and the touch position;
estimating a hand-usage state based at least on the skewness value; and
determine the skewness value using the following formula:

$$\text{skewness\_value} = \frac{\sum_{y=start}^{end} \left(\frac{y - \text{touch\_position}}{\sigma}\right)^3}{end - start},$$

where
start represents the start position of the start electrode at the first end of the array of electrodes;
end represents the end position of the end electrode at the second end of the array of electrodes;
y represents a position of a particular electrode of the array of electrodes;
touch position represents the touch position; and
σ represents a standard deviation.

8. The method of claim 7, wherein the hand-usage state indicates whether a user is interacting with the touch sensor using a finger, a thumb, or a stylus.

9. The method of claim 7, wherein the hand-usage state indicates whether a user is interacting with the touch sensor using a bare hand or a gloved hand.

10. The method of claim 7, further comprising:
determining, based on the hand-usage state, that a user is interacting with the touch sensor with a left hand; and
activating one or more touch sensitive components of the touch sensor based on the determination that the user is interacting with the touch sensor with the left hand.

11. The method of claim 7, further comprising:
determining, based on the hand-usage state, that a user is interacting with the touch sensor with a right hand; and
deactivating one or more touch sensitive components of the touch sensor based on the determination that the user is interacting with the touch sensor with the right hand.

12. The method of claim 7, further comprising communicating the hand-usage state to an operating system associated with the touch sensor, the operating system configured to adjust, based at least on the hand-usage state, one or more parameters associated with a graphical user interface.

13. One or more computer-readable non-transitory storage media embodying instructions that, when executed by a processor, cause the processor to perform operations comprising:
measuring a plurality of capacitance values, each capacitance value associated with a respective electrode of an array of electrodes of a touch sensor;
determining, based on the plurality of capacitance values, a touch position; determining a skewness value using a start position of a start electrode at a first end of the array of electrodes, an end position of an end electrode at a second end of the array of electrodes, and the touch position;
estimating a hand-usage state based at least on the skewness value; and
determine the skewness value using the following formula:

$$\text{skewness\_value} = \frac{\sum_{y=start}^{end} \left(\frac{y - \text{touch\_position}}{\sigma}\right)^3}{end - start},$$

where
start represents the start position of the start electrode at the first end of the array of electrodes;
end represents the end position of the end electrode at the second end of the array of electrodes;
y represents a position of a particular electrode of the array of electrodes;
touch position represents the touch position; and
σ represents a standard deviation.

14. The one or more computer-readable non-transitory storage media of claim 13, wherein the hand-usage state indicates whether a user is interacting with the touch sensor using a finger, a thumb, or a stylus.

15. The one or more computer-readable non-transitory storage media of claim 13, wherein the hand-usage state indicates whether a user is interacting with the touch sensor using a bare hand or a gloved hand.

16. The one or more computer-readable non-transitory storage media of claim 13, the operations further comprising:
determining, based on the hand-usage state, that a user is interacting with the touch sensor with a left hand; and
activating one or more touch sensitive components of the touch sensor based on the determination that the user is interacting with the touch sensor with the left hand.

17. The one or more computer-readable non-transitory storage media of claim 13, the operations further comprising:
    determining, based on the hand-usage state, that a user is interacting with the touch sensor with a right hand; and
    deactivating one or more touch sensitive components of the touch sensor based on the determination that the user is interacting with the touch sensor with the right hand.

* * * * *

UNITED STATES PATENT AND TRADEMARK OFFICE
CERTIFICATE OF CORRECTION

PATENT NO. : 10,768,745 B2
APPLICATION NO. : 16/529286
DATED : September 8, 2020
INVENTOR(S) : Martin J. Simmons and Thomas Myers Page 1 of 1

It is certified that error appears in the above-identified patent and that said Letters Patent is hereby corrected as shown below:

In the Specification
Column 13, Line 63, change "touch-sensor 10" to --touch sensor 10--

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*